Patented June 13, 1944

2,351,556

UNITED STATES PATENT OFFICE 2,351,556

MANUFACTURE OF SPONGE RUBBER

Edward C. Svendsen and William J. Clayton, Mishawaka, Ind., assignors to United States Rubber Company, New York, N. Y., a corporation of New Jersey No Drawing. Application September 24, 1941, Serial No. 412,128

8 Claims. (Cl. 260—723)

This invention relates to the manufacture of sponge rubber and more particularly to the manufacture of sponge rubber from latex.

Sponge rubber is commonly made by whipping a latex composition into a foam, converting the foam into the desired shape as by pouring in molds or spreading on a traveling belt, setting the foam to in irreversible gel by means of gelling agents, and drying and vulcanizing to form sponge rubber. Generally, the latex compound is whipped up into a foam or froth before the ingredients that will cause the latex to gel are added, after which the gelling agents may be beaten into the whipped foam safely poured or otherwise shaped before the latex becomes coagulated and the foam set to an irreversible gel. The setting of the foam may be made to take place at room temperature after the lapse of the necessary interval of time to take care of the manipulative operations such as pouring, scraping, spreading, and the like, or the gelling action may be accelerated by raising the temperature after shaping the foam. An excellent combination of gelling agents that will give the necessary delayed gelling action has been found to be a slightly soluble salt of fluosilicic acid, such as sodium, potassium or barium fluosilicate, and zinc oxide together with an ammonium salt of a strong acid. These two types of gelling agents apparently act in different ways. The slightly soluble fluosilicate gels the foam as a result of its progressive solution and hydrolysis to hydrofluoric acid which reduces the pH of the latex sufficiently to cause coagulation of the same after a certain period of time. The combination of zinc oxide and an ammonium salt of a strong acid gels the foam by virtue of the formation of polyvalent zinc ammonia complex ions which are well known coagulants of the dispersed rubber particles in latex.

An objection to such combination of fluosilicate, zinc oxide and an ammonium salt of a strong acid to produce gelling of the foam, as found in commercial use, has been the difficulty of maintaining the low density of the whipped foam until it has become set. The foam on addition of the gelling agents starts to thicken, and the foam structure tends to collapse with a consequent increase in the density of the foam.

The present invention relates to a method of maintaining the density of a latex foam containing a slightly soluble fluosilicate, zinc oxide and an ammonium salt of a strong acid until gelling takes place.

According to the present invention, a zinc soap and an alkali hexametaphosphate are incorporated in the latex foam which is to be gelled by means of sodium, potassium or barium fluosilicate, and zinc oxide and an ammonium salt of a strong acid. Such a foam may be converted into the desired shape as by pouring in molds, or spreading on a belt, and the foam set to an irreversible gel after the desired lapse of time with a minimum collapse of the foam structure and therefore a minimum increase in density. The invention is applicable to foams made of latex compounds, with or without filler materials, but it has been found particularly advantageous with foams made from latex compounds containing upwards of 20 parts of filler, such as barytes, clay, whiting, ground silica, or the like, per 100 parts of rubber. The term "alkali" as referring to hexametaphosphate is used in its generally accepted sense as inclusive of ammonium and alkali-metal salts, but exclusive of polyvalent-metal salts. The amounts of fluosilicate, zinc oxide and ammonium salt for sensitizing the latex, and the amounts of zinc soap and alkali hexametaphosphate for maintaining the foam density are not critical, only small amounts of these materials being necessary to carry out their intended functions. For example, .5 to 2.5 parts of sodium or potassium or barium fluosilicate, 1 to 5 parts of zinc oxide, .2 to 2 parts of ammonium sulphate or nitrate or chloride, .2 to 2 parts of zinc stearate or oleate, and .2 to 2 parts of sodium hexametaphosphate, may be used with satisfactory results, the exact proportions depending on the interval of time desired to elapse between the mixing in of the sensitizing agent and the gelling of the foam, so that in process the manipulative operations on the foam may be safely completed before gelling takes place but without too great a waste of time. Preferably, the zinc oxide and alkali silicofluoride are added after the latex has been foamed and all the other ingredients have been incorporated.

The following example is illustrative of the present invention. A latex composition of the following formulation was whipped into a foam in a conventional Hobart mixer:

| | Parts by weight |
|---|---|
| Rubber (as 60% concentrated latex) | 100 |
| Soap | 2.5 |
| Sulfur | 2.5 |
| Antioxidant | 1 |
| Accelerator | 1.5 |
| Barytes | 40 |

After being whipped to the desired foam density, the foam was transferred to a mixing apparatus equipped with stirring paddles. To the foam in the mixing apparatus was added a slurry of .5 part (dry weight) of ammonium sulphate, .5 part (dry weight) of zinc stearate, and .5 part (dry weight) of a commercial sodium hexametaphosphate, known as "Calgon," in 3.5 parts of water. There was then beaten into the foam 3 parts (dry weight) of zinc oxide in the form of a 40% aqueous paste and then 1.5 parts (dry weight) of sodium silicofluoride in the form of a 25% aqueous paste. The foam maintained its whipped density and could be poured readily into molds without its thickening or losing its foam structure. At room temperature the foam in the molds gelled in 7 to 10 minutes after mixing in the zinc oxide and sodium silicofluoride. After the foam had gelled, the molds were subjected to hot air to dry and vulcanize the foam to form sponge rubber. The maintenance during subsequent processing of the density and structure imparted to the foam by the whipping operation was markedly improved by the presence of the zinc stearate and sodium hexametaphosphate.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of maintaining the density until gelling takes place of a latex foam sensitized with small amounts of zinc oxide, an ammonium salt of a strong acid and a slightly soluble salt of fluosilicic acid from the group consisting of sodium, potassium and barium fluosilicates which comprises incorporating in the latex foam small amounts of a zinc soap and an alkali hexametaphosphate.

2. The method of maintaining the density until gelling takes place of a latex foam sensitized with small amounts of zinc oxide, an ammonium salt of a strong acid and a slightly soluble salt of fluosilicic acid from the group consisting of sodium, potassium and barium fluosilicates which comprises incorporating in the latex foam small amounts of a zinc soap and sodium hexametaphosphate.

3. The method of maintaining the density until gelling takes place of a latex foam sensitized with small amounts of zinc oxide, ammonium sulphate and a slightly soluble salt of fluosilicic acid from the group consisting of sodium, potassium and barium fluosilicates which comprises incorporating in the latex foam small amounts of a zinc soap and sodium hexametaphosphate.

4. The method of maintaining the density until gelling takes place of a latex foam sensitized with small amounts of zinc oxide, ammonium sulphate and sodium fluosilicate which comprises incorporating in the latex foam small amounts of a zinc soap and sodium hexametaphosphate.

5. The method of maintaining the density until gelling takes place of a latex foam containing at least 20 parts filler per 100 parts rubber and which is sensitized with small amounts of zinc oxide, an ammonium salt of a strong acid and a slightly soluble salt of fluosilicic acid from the group consisting of sodium, potassium and barium fluosilicates which comprises incorporating in the latex foam small amounts of a zinc soap and an alkali hexametaphosphate.

6. The method of maintaining the density until gelling takes place of a latex foam containing at least 20 parts filler per 100 parts rubber and which is sensitized with small amounts of zinc oxide, an ammonium salt of a strong acid and a slightly soluble salt of fluosilicic acid from the group consisting of sodium, potassium and barium fluosilicates which comprises incorporating in the latex foam small amounts of a zinc soap and sodium hexametaphosphate.

7. The method of maintaining the density until gelling takes place of a latex foam containing at least 20 parts filler per 100 parts rubber and which is sensitized with small amounts of zinc oxide, ammonium sulphate and a slightly soluble salt of fluosilicic acid from the group consisting of sodium, potassium and barium fluosilicates which comprises incorporating in the latex foam small amounts of a zinc soap and sodium hexametaphosphate.

8. The method of maintaining the density until gelling takes place of a latex foam containing at least 20 parts filler per 100 parts rubber and which is sensitized with small amounts of zinc oxide, ammonium sulphate and sodium fluosilicate which comprises incorporating in the latex foam small amounts of a zinc soap and sodium hexametaphosphate.

EDWARD C. SVENDSEN.
WILLIAM J. CLAYTON.